United States Patent [19]
Elrod et al.

[11] Patent Number: 5,495,269
[45] Date of Patent: Feb. 27, 1996

[54] LARGE AREA ELECTRONIC WRITING SYSTEM

[75] Inventors: Scott A. Elrod, Redwood City; David L. Steinmetz, Mountain View, both of Calif.

[73] Assignee: Xerox Corporation, Stamford, Conn.

[21] Appl. No.: 863,650

[22] Filed: Apr. 3, 1992

[51] Int. Cl.$^6$ .................................................. G09G 3/02
[52] U.S. Cl. ........................ 345/179; 345/178; 359/448
[58] Field of Search ................................ 340/706, 707; 359/443, 447, 448, 449, 451, 452, 453, 460; 345/178, 179; 178/18

[56] References Cited

U.S. PATENT DOCUMENTS

| | | | |
|---|---|---|---|
| 3,539,717 | 11/1970 | Baker | 178/7.6 |
| 3,917,955 | 11/1975 | Inuiya | 250/549 |
| 4,089,587 | 5/1978 | Schudel | 359/451 |
| 4,164,081 | 8/1979 | Berke | 35/25 |
| 4,565,999 | 1/1986 | King et al. | 340/706 |
| 4,873,398 | 10/1989 | Hubby, Jr. | 340/706 |
| 5,025,314 | 6/1991 | Tang et al. | 358/93 |

FOREIGN PATENT DOCUMENTS

| | | | |
|---|---|---|---|
| 0281436 | 9/1988 | European Pat. Off. | G02B 5/124 |
| 2657701 | 8/1991 | France | G03B 21/60 |
| 60-230228 | 11/1985 | Japan | G06F 3/03 |
| WO9101543 | 2/1991 | WIPO | G09G 1/28 |

*Primary Examiner*—Jeffery Brier
*Attorney, Agent, or Firm*—R. Christine Jacobs

[57] ABSTRACT

Collaborative work on an interactive system is facilitated by accurately capturing and displaying information on an interactive system, wherein multiple persons may work together for supplying and receiving information with a single large area display. A large area electronic writing system is provided which employs a large area display screen, an image projection system, and an image receiving system including a light emitting pen. The display screen is designed with the imaging surface in front of the substrate, with a thin abrasion resistant layer protecting the imaging surface from the pen tip. The screen is held together with dowel pins pressed through the layers, and is curved to provide pressure for holding the layers together and mechanical rigidity against flexure during writing. The imaging surface disperses light from both the projection system and the light pen. The image receiving system comprises a very large aperture lens for gathering light energy from the light spot created by the light emitting pen. The amount of energy from the light spot which reaches the integrating detector is more critical to accurate pen position sensing than the focus of the light spot, so that the aperture of the lens is more important than its imaging quality. The light emitting pen is modified to additionally disperse light at its tip.

7 Claims, 7 Drawing Sheets

LARGE AREA ELECTRONIC WRITING SYSTEM

BACKGROUND OF THE INVENTION

The present invention relates generally to electronic writing systems. More specifically, the invention relates to techniques for accurately capturing and displaying information on an interactive system, wherein multiple persons may work together for supplying and receiving information with a single large area display.

In a collaborative working environment, several users may wish to view and manipulate displayed information simultaneously. It is desirable to provide a computer controlled electronic large area display system measuring several feet across (both horizontally and vertically.). Each of the multiple users would manipulate an input device which could be used simultaneously and independently for controlling its related pointer on the display in order to position a cursor, select an item from a menu, draw upon the display screen, or perform any number of standard functions. In this way the actions of each user would be readily visible to all the members of the group, who would interact together much as they would relative to a conventional chalkboard or whiteboard.

Computer systems generally incorporate a display unit for providing a visual indication to the user of selected data. A specific location marker, such as a pointer, may be moved by the user to any desired point on the display in order to locate a cursor for the entry of keystroke characters, to trace the locus of points as in drawing alphanumeric characters or other patterns, to invoke and manipulate a functional command such as paint or erase, to open a menu, to invoke a displayed command, or to invoke other interface functions. In each case the location of the pointer must be known, and in many applications the desired control function should be known as well.

Pointer positioning, as a computer input device, has been commonly effected in a variety of ways. For example, by designated keys on a keyboard, by a freely movable "mouse" having one or more function selection buttons thereon, by a "joystick," by means of a stylus upon a graphics input tablet, or by a light pen. Each has its own unique advantages. Keyboard input allows the user to designate a location without removing hands from the keyboard; a mouse is easily and rapidly movable over a pad in correspondence to the display area and its function selection buttons allow various common functions to be invoked; the joystick is also a rapid positioning device; the stylus enables freehand input, and the light pen gives the user additional remote operation in proximity to the display surface.

An imaging system for such a large area writing system may be either projection or non-projection type. A projection-type imaging system desirably should comprise a projection subsystem for projecting the computer display image upon one side of an imaging surface, and a retrieval subsystem for detecting location or function information from the user input device. The image retrieval subsystem should be equally capable of retrieving information from the user's input device when remote from the screen, or when "writing" directly on the screen.

An imaging surface for such a large area writing system should desirably comprise a screen with an imaging surface at or near the front of the screen. The screen should be capable of dispersing light from either a user's light emitting input device or from the projector projecting the computer display image. The screen should be mechanically rigid and durable, and should have a naturally fluid writing "feel," much like a conventional chalkboard or whiteboard, when the user "writes" on it.

A direct input device for such a large area writing system should desirably comprise a wireless light pen emitting optical radiation which could be detected behind the display screen. It should be equally usable, relative to the display screen, as a remote pointer by users comfortably seated several feet from the screen, as well as in "writing" contact with the screen. Being wireless, the pen would have enhanced usability as a collaborative tool since it could be used as a light spot projection device at optimum distances between the screen surface and several feet from it. With wired pens and multiple users, the wires would probably get tangled in this collaborative mode of usage. When the user is writing upon the screen it is preferable to maintain the light pen in contact with the surface being written upon. However, it would be quite practical to project the light spot from several feet away from the screen. The wireless light pen should be capable of pixel location accuracy and should be carefully designed for environmental safety so that, at normal distances of use, its optical beam would be incapable of focusing a light spot on the eye and causing eye damage. The electronic instrumentation controlling the light pen input system is more fully described in copending, coassigned U.S. patent application Ser. No. 07/608,439 of S. A. Elrod et al., entitled "POSITION AND FUNCTION INPUT SYSTEM FOR A LARGE AREA DISPLAY," incorporated herein by reference.

SUMMARY OF THE INVENTION

The present invention provides one or more input devices for simultaneously and independently entering information into a large area electronic writing system comprising a large area viewing surface upon which is displayed information generated by the electronic system. The output illumination of each input device uniquely identifies the source and the function to be performed and is projected as a light spot upon the display surface. Projected illumination from all of the input devices falls upon a receiving subsystem which generates output signals representative of the total optical input of the light spots.

The writing system includes a display screen with good light dispersion which ensures that for any location on the screen, the signal reaching the detector is sufficiently large. The display screen also has properties that reduce parallax errors. A means for projecting a light spot is included, which may be modified to input additional information. The receiving subsystem includes means for sensing the light spot and displaying an indicator indicative of the location of the light spot. The input subsystem includes an imaging lens with a large aperture and a position sensing integrating detector.

The display screen of the invention is made up of a substrate having an imaging surface that is toward the user instead of the more typical configuration of behind the substrate. A very thin protective layer covers the imaging surface and protects it from being damaged by the pen. The protective layer is tightly stretched over the substrate and secured with dowel pins which are pressed through the layers. The large screen is mounted to be mechanically rigid without internal supports, as supports would interfere with the rear projection display.

It is an object of the invention to provide a large area electronic writing system which may be used in a substantially similar manner as a conventional whiteboard-type writing system.

One aspect of the invention is based on recognition that using the input system of the large area electronic writing system should give the user the same "feel" as using a conventional whiteboard-type system, and should require little or no special training or skills to use. In response to a user input from a light pen, the system should accurately determine the location of the input and display a cursor or other appropriate display feature which corresponds to the pixel location of the input. The screen must be mechanically rigid as well as durable.

Another aspect of the invention is based on the recognition that the writing system must disperse light from the display projection to allow for viewing the screen from varied angles, and also must disperse light significantly from the input devices to allow detection of the light energy.

The following description, the drawings and the claims further set forth these and other objects, features and advantages of the invention.

DETAILED DESCRIPTION

A General Features

Figure 1:
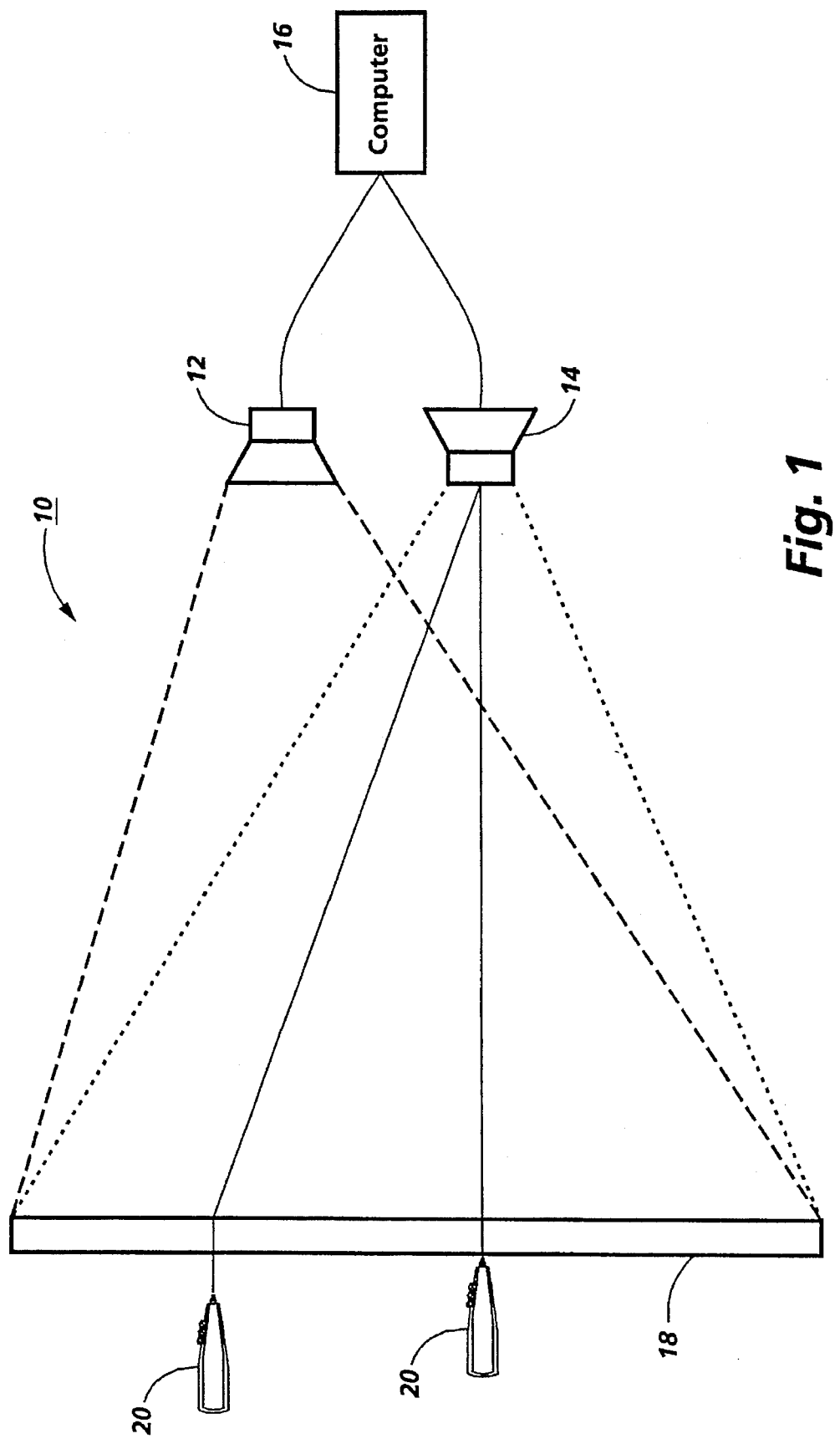
FIG. 1 shows a large area display terminal.

Turning now to the drawings, FIG. 1 shows a large area display terminal 10 in the form of a rear projection system comprising projection subsystem 12 and receiving subsystem 14 controlled by computer 16. The image is projected onto screen 18. One or more light pens 20 (two shown) project a signal towards screen 18. The light beam from each pen 20 is received by receiving subsystem 14 which conveys information concerning the location of each pen to computer 16.

In a rear projection screen such as for a rear projection television, the plastic material of the screen is frequently etched with vertical lines which disperse projected light horizontally to encompass a relatively narrow range of viewing angles in the direction of the audience. In a television, for example, viewers are expected to be at some distance and primarily directly in front of the screen, and not looking at the screen from the top, bottom, or from the extreme sides. By directing the light towards the front, light is not wasted on areas where there are no expected viewers.

For a system such as display system 10, however, it is less advantageous to direct the light dispersion of the projection subsystem so specifically. In a typical collaborative work environment, the users may walk around and change position relative to the screen in order to write upon the screen or open the screen up to viewing by others. Users may be at some distance in front of the screen, but may also be close to the screen, or at one side looking across the screen. In this case the screen should appear more like a conventional writing surface, such as a whiteboard. The screen should not display noticeable lines, and should diffuse the light at fairly wide angles so that users can see the display image from a wide variety of angles.

Figure 2:
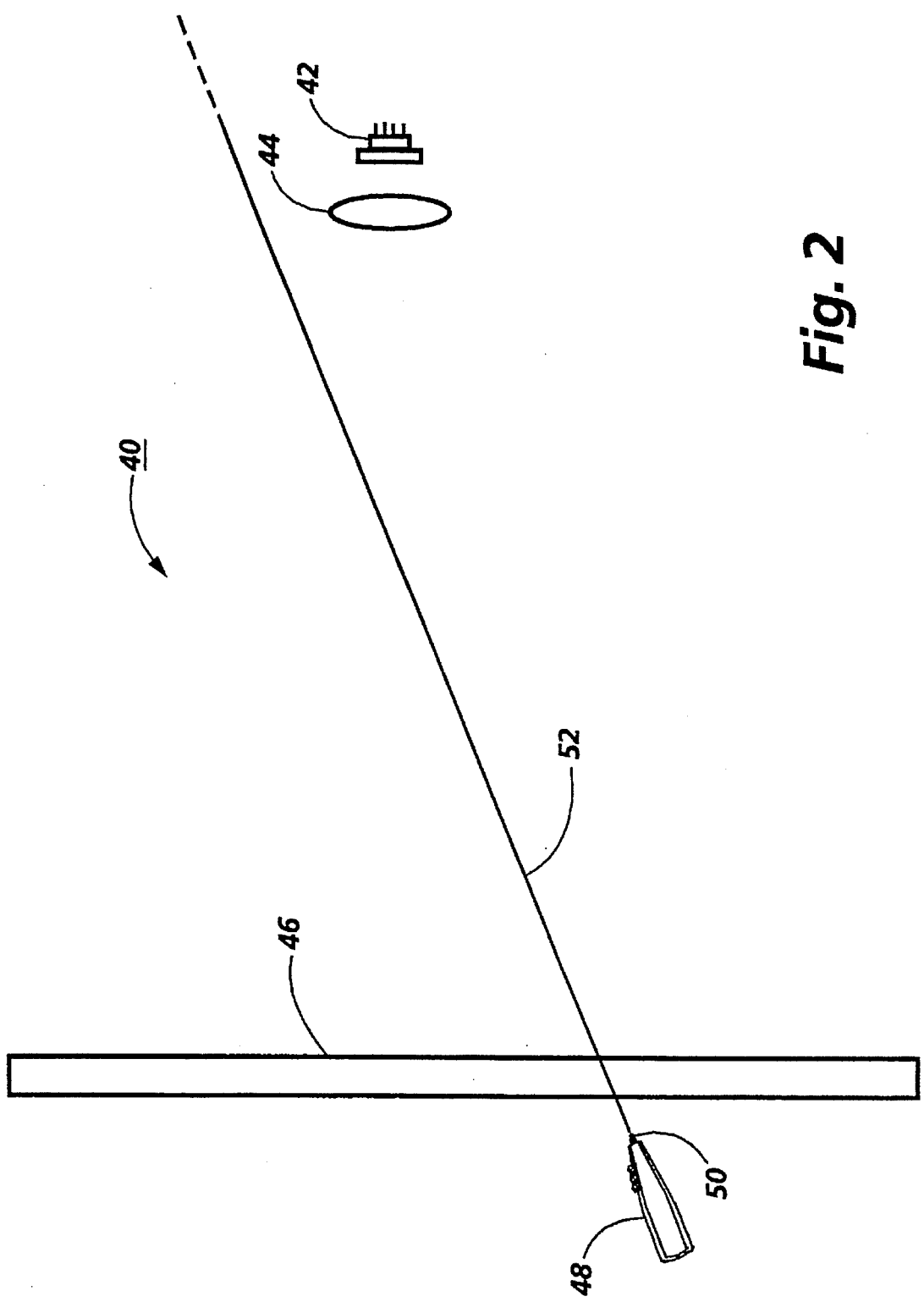
FIG. 2 shows a receiving subsystem with a non-dispersive light projection means and a non-diffusing screen.

The receiving subsystem also depends on the light dispersion properties of the system. FIG. 2 illustrates a problem with systems that do not exhibit sufficient light dispersing properties, and FIG. 3 shows a similar system that does have good light dispersing properties.

In FIG. 2 there is shown a receiving subsystem 40. Subsystem 40 has an essentially non-diffusing screen 46, and a lens 44 and detector 42 for receiving pen location information. Pen 48 has a non-dispersive tip 50 which produces an effectively straight beam of light 52. The light tip of 50 may be, for example, a laser or an LED with an appropriate collimating lens. Light beam 52 goes through screen 46 in an effectively straight path from the pen tip. It can be seen in FIG. 2 that light from pen 48 never reaches lens 44 or detector 42 unless pen 48 happens to be aimed directly at lens 44.

Figure 3:
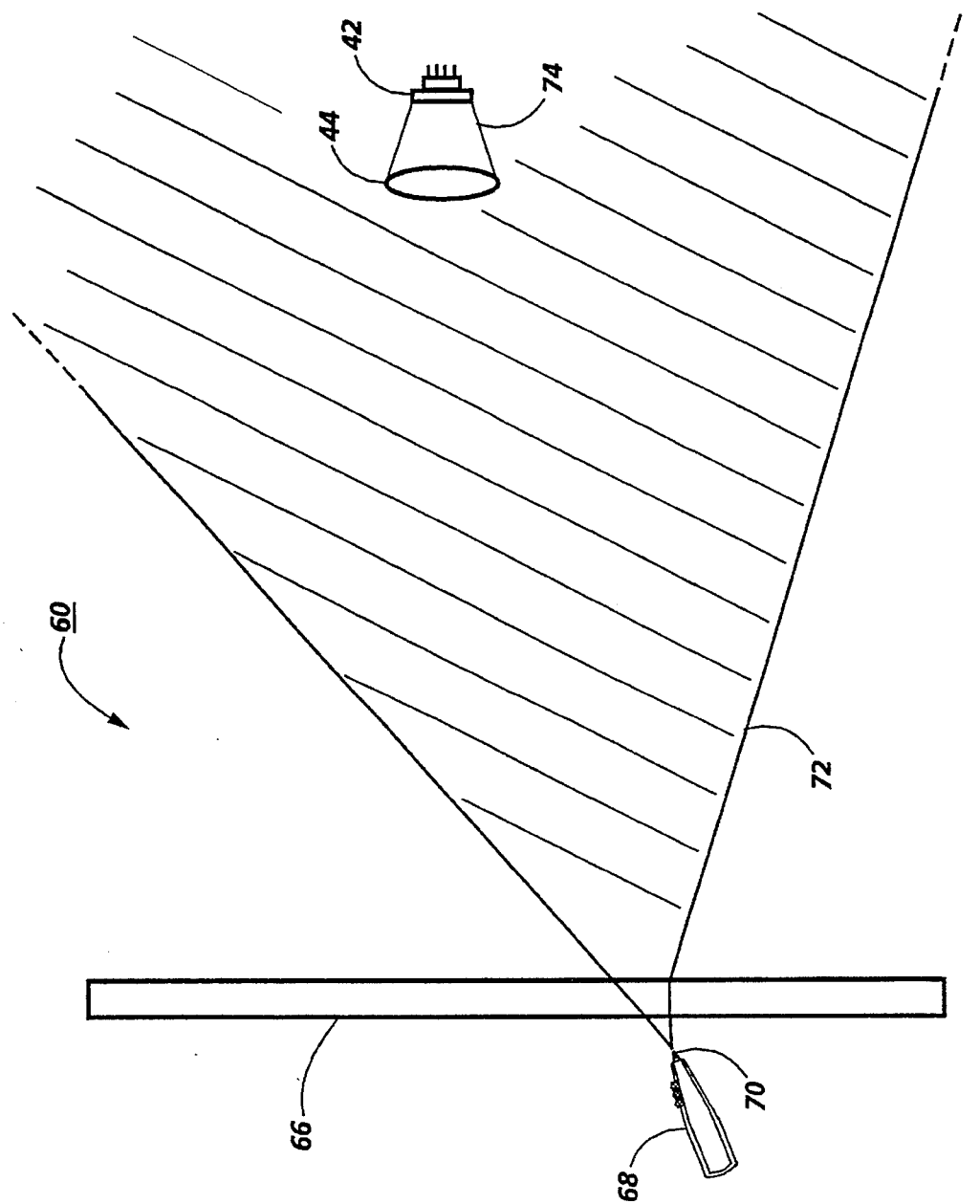
FIG. 3 shows a receiving subsystem with a dispersed light projection means and a light diffusing screen.

In FIG. 3 receiving subsystem 60 is shown. Subsystem 60 has a lens 44 and detector 42 for determining pen location information. In subsystem 60, screen 66 has a light diffusing surface on the front side. In addition, the tip 70 of pen 68 disperses light as well. Pen 68 is positioned towards screen 66 in the same orientation that pen 48 had to screen 46. Light 72 diverges as it leaves pen 70, and additionally as it passes through screen 66. Some energy from the diverged beam of light hits lens 44, which projects light 74 towards detector 42, and enables the computer to locate the centroid of light from pen 68. Some LED lenses are designed to disperse light fairly widely, or the tip of the LED may be modified to diffuse the light more widely than the natural lens so that a more uniform amount of light from the pen will be scattered towards the detector at all locations on the screen and for all angles of the pen on the screen. Roughening the lens with sandpaper, for example, will cause the LED tip to disperse light more widely.

In the subsystem of FIG. 3, the accuracy of the spot determination of the detector is dependent upon having a signal with a very high signal-to-noise ratio. In order to achieve this, the highest possible signal level is desired. In the present invention, detector 42 is a position sensing photodiode. Since, by its nature, it integrates light to produce output signals proportional to the centroid of the light spot, it is not important whether the light which reaches the detector is a very sharp image or is distributed over a large area and is relatively fuzzy. It is only the total power of the light which reaches the detector that matters, because the detector will determine the centroid of even a blurry spot. Thus the subsystem of the invention is able to use a lens for gathering light that has a low imaging quality, but that has a very large aperture corresponding to about f1 or less.

Because of the nature of the position sensing photodiode used in the integrating detector, methods for increasing the quality of the imaging system—for example, using a laser to provide a precise point of light, or using a high quality lens with a more restricted aperture-do not provide a more accurate measure of the location of the centroid of the spot for each pen.

Figure 4:
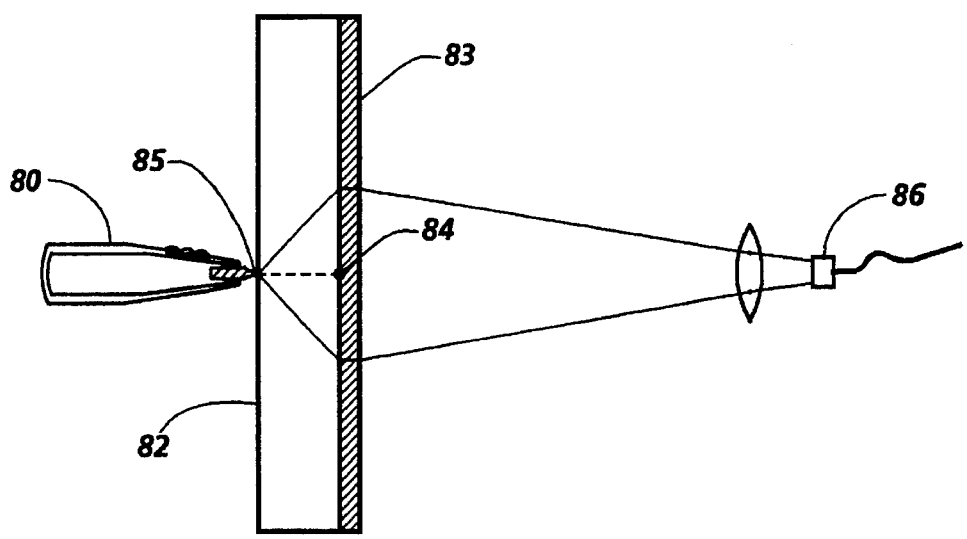
FIGS. 4 and 5 illustrate parallax problems with some conventional large area display screens.
Figure 5:
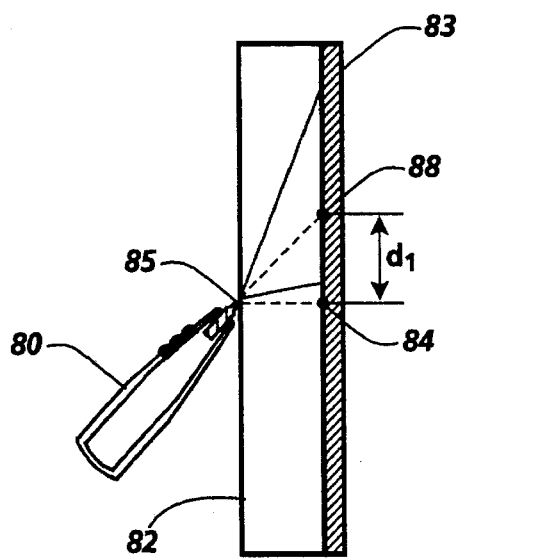

FIGS. 4 and 5 illustrate a problem with parallax that will occur with many large screen display systems unless adequate precautions are taken in the design of the light source and screen. Parallax describes a condition in which an apparent change in position occurs in relation to a change in line of sight. In the case of large screen displays, parallax may result in an observable difference between the location where a user observes that a light pen is positioned on the screen, and the location where the computer positions a cursor in response to where the computer detects the light pen on the screen.

In FIG. 4, a light pen 80 is shown in writing position against a conventional screen 82. The conventional screen has a diffuse imaging surface 83 on one side, where the image is formed. The imaging surface is quite delicate, so the screen is placed with the imaging surface on the side away from the pen, with the substrate in front protecting the imaging surface from contact with the pen tip. When pen 80 is placed exactly normal to screen 82 at location 85, the light disperses evenly and the centroid 84 of the light from pen 80 is detected by detector 86 as being located directly at the location that the user is pointing to. If the computer were producing a cursor responsive to the pen, it would be located at the centroid of the light spot and would appear to be directly at location 84, where the user is pointing.

In FIG. 5, pen 80 is shown with the tip at the same location 85 on screen 82. However, pen 80 is in a writing position that is at a significant angle to screen 82. In normal use, it would not be unusual for a pen to be at some angle to the screen. In this case, although the user is pointing to the same physical location 84, the centroid 88 of the light spot from pen 80 is offset from location 84 by a distance $d_1$. As the angle of pen 80 to the screen 82 increases, so does the offset $d_1$ between the physical location pointed to by the user and the centroid of the light spot 88. As a result of the long path through the substrate between location 85, where the pen touches screen 82, and the imaging surface 83, the computer system may place the cursor at a location a significant distance from the location pointed to by the user.

Figure 6:
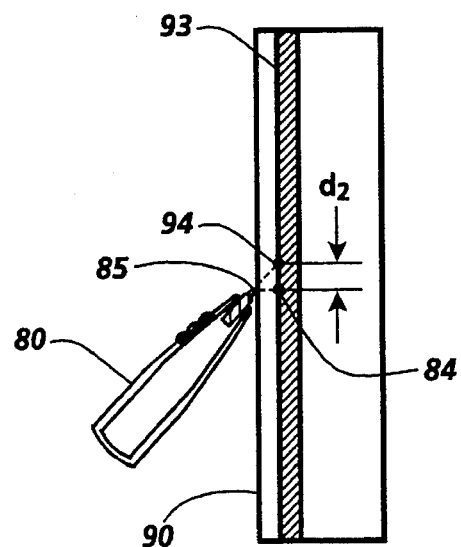
FIG. 6 shows reduced parallax between the location pointed to by the user and the location recognized by the computer.

FIG. 6 shows a method of reducing the parallax between the location pointed to by the user and the location recognized by the computer. In FIG. 6 there is shown screen 90 in accordance with the current invention. In this case, the conventional screen surface has been positioned so that the supportive substrate is located away from the user, and the imaging surface is on the forward side of the screen. A layer of Lucite-SAR, an abrasion resistant transparent thermoplastic acrylic resin (Lucite), very thin compared to the substrate material of the screen, is placed over the imaging surface 93. In the present invention the substrate material is about ¼ inch thick, and the Lucite-SAR layer is about 1/16 inch thick. Thus the path length between the tip of the pen 80 and the imaging surface 93 is significantly reduced. When the user points to location 84, the location of the centroid 94, where the computer will place the cursor, is offset by only a small distance $d_2$.

B. An Implementation

Figure 7B:
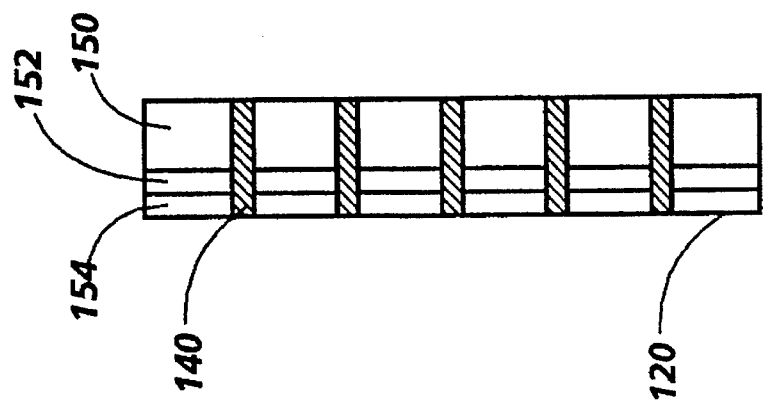
FIGS. 7(a) and (b) show a screen made according to the invention.
Figure 7A:
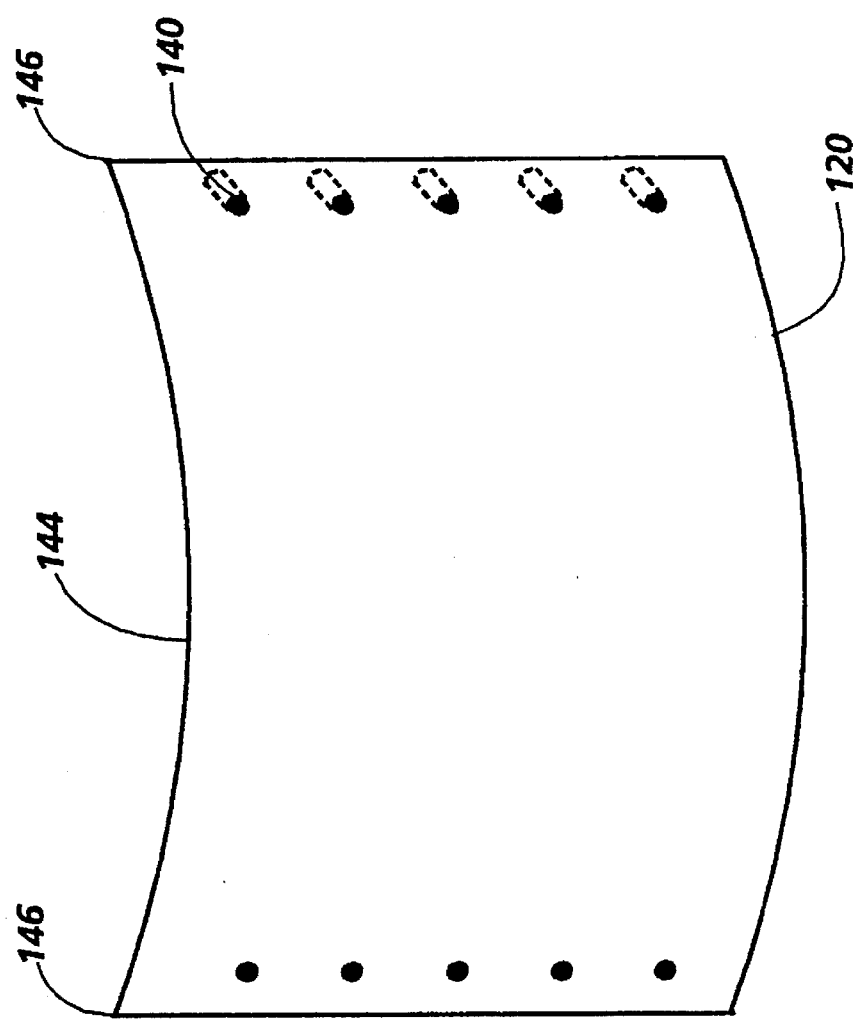

FIG. 7 shows a preferred embodiment of a screen 120 made according to the invention. FIG. 7(a) shows approximately a front view of the screen, and FIG. 7(b) shows a cross sectional view of the screen with an imaging layer 152 juxtaposed between a substrate 150 and a smooth, durable protective layer 154. Layer 150 is a backing substrate of about ¼ inch thick acrylic plastic or Plexiglas, a permanently transparent thermoplastic. Layer 152 is an imaging surface layer made of a thin sheet of Duralene, a graphic arts drawing material manufactured by Seth Cole of Los Angeles, Calif. Duralene is an inexpensive transparent material which has good light dispersive qualities, but is quite fragile and could be easily damaged if exposed to the tip of the pen. Imaging layer 152 is affixed to backing layer 150 with ReMount, an adhesive product of 3M Corporation of St. Paul, Minn. ReMount adhesive is sprayed in a very thin layer onto the substrate, and Duralene is placed on top of it and rolled smooth and even with a rubber roller. Front protective layer 154 is a 1/16 inch layer of Lucite-SAR, attached to the substrate and Duralene composite by one or more (five shown) dowel pins 140. In the current embodiment, five dowel pins each 1/16 inch in diameter are pressed through the layers. The screen is mounted in a convex curve (as viewed) so that center front 144 is slightly forward of the two side edges 146. In the current embodiment, each side edge of the screen is mounted about 1½ inches back of the center front. This stretches the front Lucite layer 154 over the substrate and Duralene composite, holding the layers together tightly with a great deal of pressure. Movement between the layers of the screen, which may affect the calibration of the screen, is restricted by the pressure of the layers. In addition, the curved screen also provides more mechanical rigidity against flexure during writing, giving the user a firm "feel" when writing on the screen, with no additional supports that might interfere with the rear projection display image.

In another embodiment of the screen of the invention, the screen is constructed of DA-Glass Plexiglas with a DA-WA etched surface, coated with Protek glaze, manufactured by DaLite of Warsaw, Ind. The imaging surface etched into the substrate is quite fragile and could be easily damaged if exposed to the tip of the pen. To avoid introducing parallax problems as described in relation to FIG. 5, the substrate is positioned with the imaging surface to the front. A protective layer of Lucite-SAR is applied over the substrate imaging surface. The Lucite-SAR is secured over the DA-WA by dowel pins pressed through the two materials. The screen is then mounted in a convex curve (as viewed) in which the side edges of the screen are about 1½ inches back of the front center of the screen. The screen of this embodiment may be somewhat more expensive than the previously described embodiment, but may be easier to manufacture in quantity. It also provides mechanical rigidity without additional supports which might block the rear projection display image.

Figure 8:
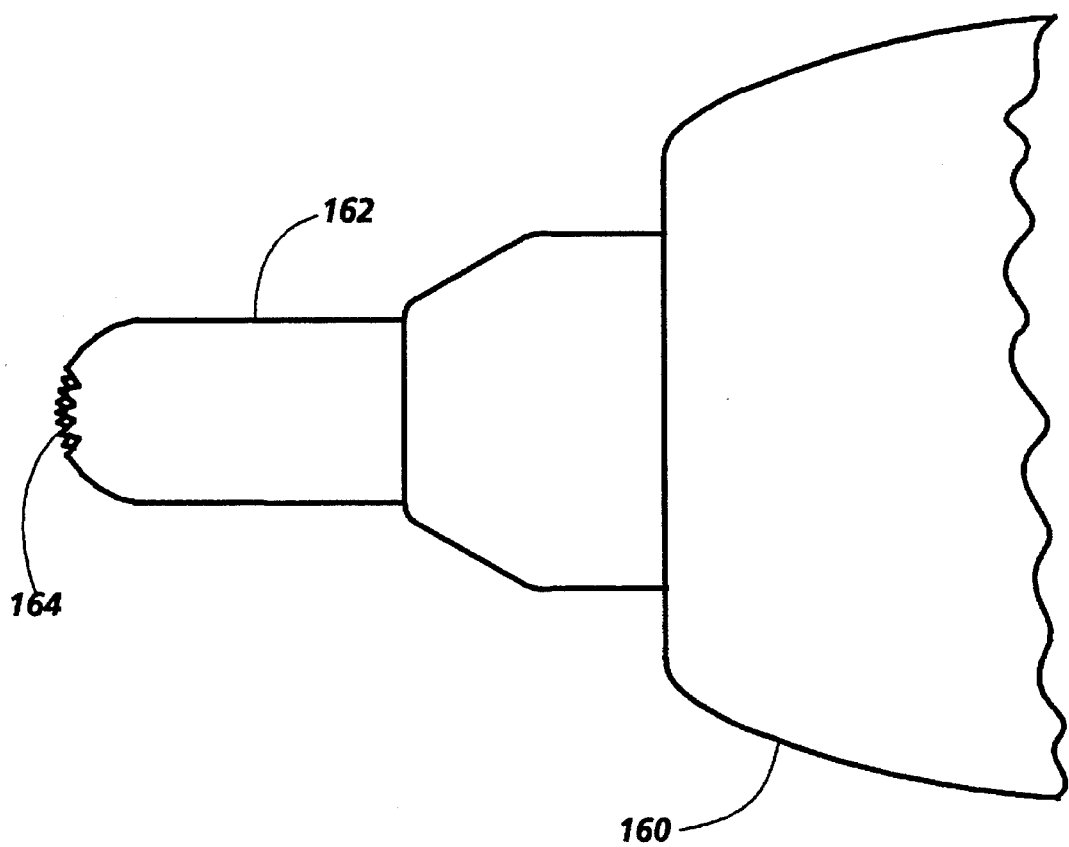
FIG. 8 shows a light pen modified according to the invention.

To add to the light diffusing properties of the system, the light pen may additionally be modified as shown in FIG. 8. A portion of pen 160 is shown with an LED 162 at one end. LEDs typically have a lens which is made of plastic which refracts the light through a restricted range. In the current invention, the tip 164 of the LED may be roughened with a fine grain sandpaper to produce a more diffused light output pattern, thus scattering a more uniform amount of light from the pen to the detector.

It should also be noted that the LED, unroughened or toughened as described in relation to FIG. 8, would scratch most regular acrylic or Plexiglas, but the Lucite-SAR of layer 154 described in relation to FIG. 7 provides an abrasion resistant surface for the pen to write on.

Another option to protect the screen from scratches by the pen may be to spray a thin layer of a silicone lubricant, such as SLIC Silicone Lubricant, a product of Tech Spray of Amarillo, Tex., or other light spray-on lubricant, over the protective layer of the screen to reduce the friction of the pen with the screen and provide a more fluid, natural feeling writing system. The lubricant is sprayed on the screen and rubbed in so that only a very light residue of lubricant is present on the screen. If the lubricant layer is too thick, the writing system will feel too "slippery" to the user.

Figure 9:
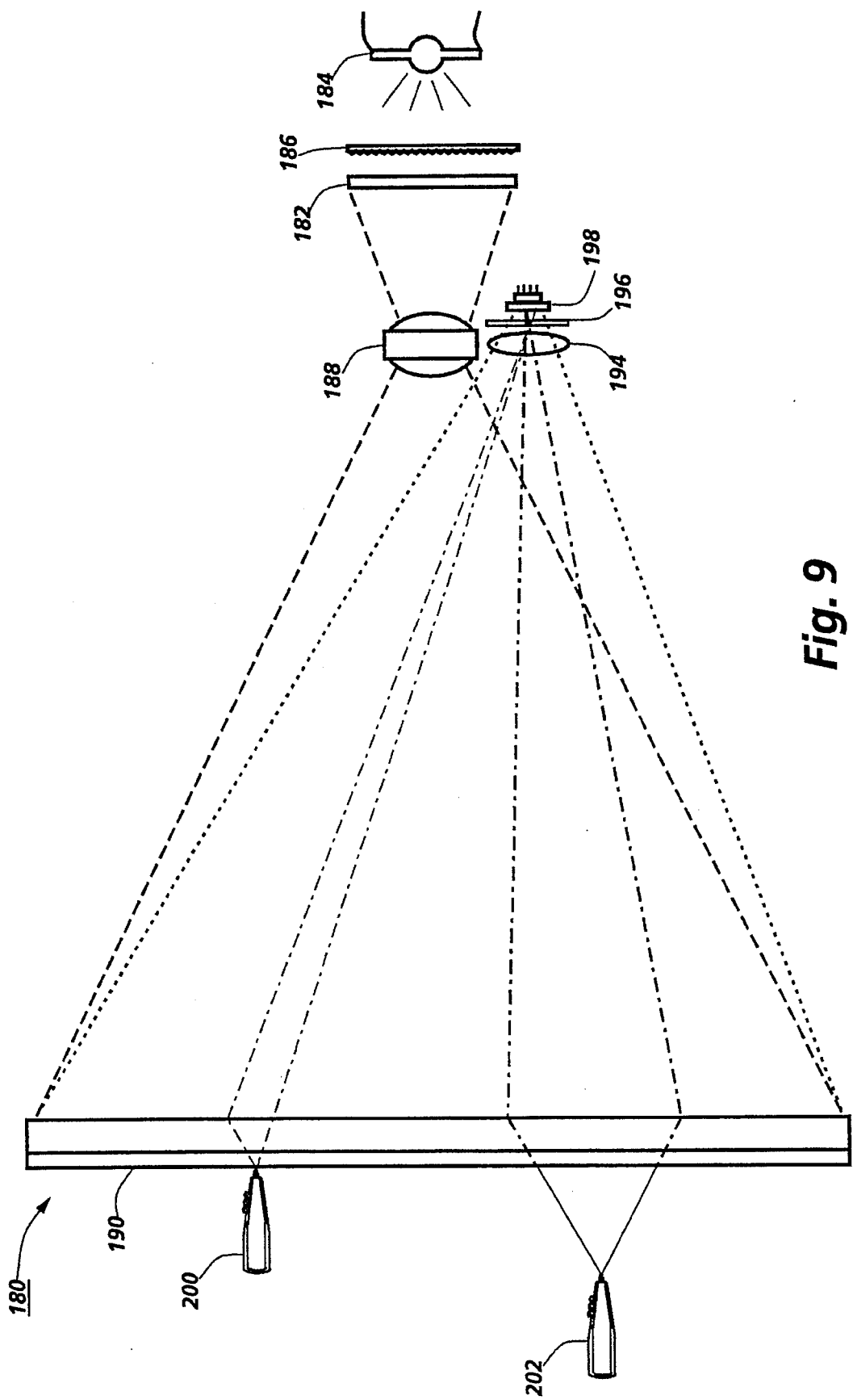
FIG. 9 shows an accurate and economical large area electronic writing system of the present invention.

FIG. 9 shows a more accurate and economical large area electronic writing system according to the present invention. In FIG. 9 a large area display terminal 180 is shown in the form of a rear projection system comprising a one million pixel liquid crystal light valve panel 182, controlled by a computer (not shown) such as a SPARCStation-2 from Sun Microsystems, of Mountain View, Calif. The panel 182 is interposed between a high intensity projection lamp 184, such as a 650 watt Xenon arc lamp, focused by Fresnel lens 186, and a 270 mm projection lens 188. The image is magnified about fivefold to illuminate, at about twenty spots per inch, a slightly convex curved (as viewed) display screen 190 having an area of about three feet by five feet.

One or more wireless light pens 200 (two shown) project a beam of light from a light source 202, such as a Siemens SFH485 5 mm diameter, 8 mm long LED, onto the front surface of the screen 190 at a location where the user desires to indicate input, such as locating a pointer. The tip of the LED is roughened with fine grain sandpaper, as described in relation to FIG. 8, to increase the scattering of light by the light source. It would be practical to maintain the light pen in contact with the surface being written upon, or to project the light spot from several feet away from the screen. It should be noted that as a remote pen projects a larger light spot, the effective zone of accurate usage gets closer to the center of the screen because too much light falls off the screen.

Therefore, a secondary consideration is that the tip of the light pen should not disperse light so broadly that the position of the light spot does not change in relation to a change in the angle of a remote pen. The roughened surface, as described in relation to FIG. 8, produces enough light dispersion to reduce intensity variations with the position and angle of the pen when the pen is touching the screen, without significantly degrading the ability of the system to detect changes in the position of the pen when held remotely.

The user's feedback is generated by the electronic system and presented on the display in response to the information obtained by the receiving subsystem. The feedback may take the form of an indicator or cursor located at the pixel location corresponding to the location pointed to by the light pen.

A large curvature demagnification lens 194, such as a Melles-Griot aspheric condenser lens #01-LAG-115, aperture 32.5, focal length 23.5 and f0.72, directs the light spot from the user's light pen through a filter 196 which blocks out spurious light and then focuses the spot upon a position sensing photodiode 198.

Position sensing photodiode 198, such as UDT SC25D quadrant detector, from United Detector Technology of Hawthorne, Calif., is a continuous dual axis position sensor that provides both x and y axis position information. It senses the centroid of a light spot and provides continuous analog outputs as the spot traverses the active area. Suitable electronic instrumentation, described in the copending, coassigned U.S. patent application Ser. No. 07/608,439 of S. A. Elrod et al., entitled "POSITION AND FUNCTION INPUT SYSTEM FOR A LARGE AREA DISPLAY," allows the x,y coordinates to be separated and displayed as a pointer upon the projection screen 190.

C. Miscellaneous

An input device for such a large area writing system may alternatively include a light pen in which bundled optic fibers, of either glass or plastic, are coupled to the light source and provided at the tip. Such a fiber optic tip may provide a "feel" more similar to the feel of a felt tip pen against a conventional whiteboard. Such a fiber optic pen may have a laser light source coupled to the optic fibers which would be able to efficiently convert electrical energy from the battery source into light energy. The optic fibers may naturally diverge the light at the pen tip, or may be appropriately formed to diverge the light at the pen tip.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A large area electronic writing system, comprising:
   a parallax reducing display screen with a light dispersive imaging surface;
   means for projecting a modifiable light spot representing input location information upon one side of said imaging surface;
   means for sensing said light spot and for generating output signals representative of said input location information, said means for sensing being located on a second side of said imaging surface and comprising:
      a large aperture imaging lens, said aperture corresponding to f1.0 or less; and
      a position sensing integrating detector, said large aperture imaging lens focusing energy from substantially the entire imaging surface upon said position sensing integrating detector; and
   rear-projection means for displaying information upon said second side of said imaging surface, whereby said displayed information indicates an accurate pixel location corresponding to said light spot input location information.

2. A large area electronic writing system as described in claim 1, wherein said parallax reducing display screen further comprises
   a layer of rigid, transparent substrate;
   said light dispersive imaging surface; and
   a protective layer, said protective layer being significantly thinner than said substrate layer;
said imaging surface being juxtaposed between said substrate and said protective layer, said display screen being positioned with one side of said protective layer being located immediately adjacent to said one side of said imaging surface.

3. A large area electronic writing system as described in claim 2, wherein said display screen further comprises a thin layer of lubricant on a second side of said protective layer.

4. A large area electronic writing system as described in claim 1, wherein said parallax reducing display screen further comprises
   a layer of rigid, transparent substrate:
   said light dispersive imaging surface, said second side of said imaging surface being adjacent to said substrate; and
   a protective layer adjacent to said one side of said imaging surface, said protective layer being significantly thinner than said substrate layer; whereby parallax is reduced when said light spot source is in contact with said protective layer.

5. A large area electronic writing system as described in claim 1, wherein said projecting means for a modifiable light spot representing location information comprises a light emitting diode with a roughened tip surface.

6. A large area electronic writing system, comprising:
   a parallax reducing, highly dispersive display screen with a light dispersive imaging surface;
   a widely divergent modifiable light beam representing input location information towards one side of said imaging surface;

a sensor for sensing said light beam and for generating output signals representative of said input location information, said sensor being located on a second side of said imaging surface and comprising:
  a large aperture imaging lens, said aperture corresponding to f1.0 or less; and
  a position sensing integrating detector, said large aperture imaging lens focusing energy from substantially the entire imaging surface upon said position sensing integrating detector; and a rear-projector for displaying information upon said second side of said imaging surface, whereby said displayed information indicates an accurate pixel location corresponding to said input location information.

7. A large area electronic writing system as described in claim 6, wherein said position sensing integrating detector is a position sensing photodiode.

\* \* \* \* \*